March 10, 1931.    M. LAVEQUE    1,796,207
NUT LOCK
Filed March 1, 1930
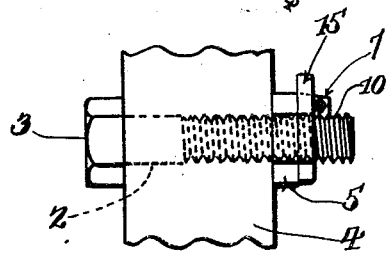
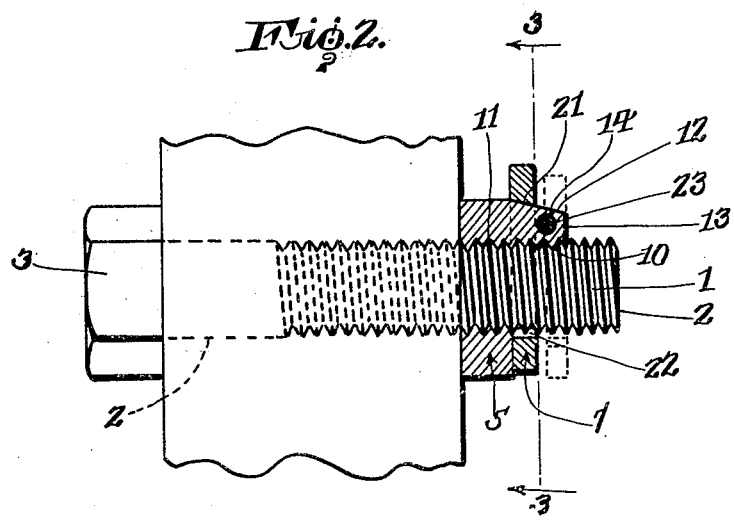
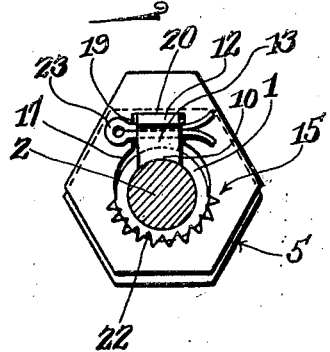 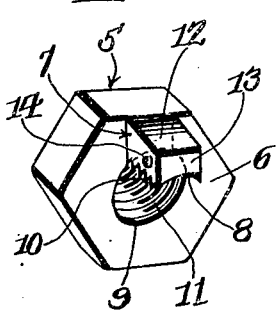 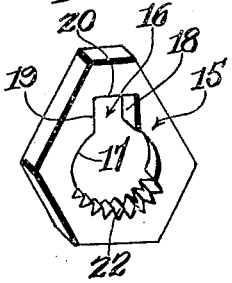
INVENTOR.
Mose Laveque
BY
Geo. F. Kimmel
ATTORNEY.

Patented Mar. 10, 1931

1,796,207

UNITED STATES PATENT OFFICE

MOSE LAVEQUE, OF MUNISING, MICHIGAN, ASSIGNOR OF ONE-FOURTH TO E. S. WALTERS AND ONE-FOURTH TO T. W. SCHOLTES, BOTH OF MUNISING, MICHIGAN

NUT LOCK

Application filed March 1, 1930. Serial No. 432,485.

This invention relates to nut locks, and has for its object to provide, in a manner as hereinafter set forth, a lock of such class for preventing the turning of a nut in a direction from off a bolt when the nut is in securing position whereby the latter is held in such position, and further with the lock so constructed and arranged to enable the convenient release of the nut from off the bolt when occasion requires.

A further object of the invention is to provide, in a manner as hereinafter set forth, a nut lock which is simple in its construction and arrangement, strong, durable, compact, readily assembled, thoroughly efficient in its use, conveniently set in locking position and released when desired, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a nut lock in accordance with this invention and further illustrating the adaptation thereof with respect to a bolt and the object through which the bolt extends.

Figure 2 is a vertical sectional view of the nut lock and further illustrating the adaptation thereof with respect to a bolt and also showing in dotted lines the locking washer in non-locking position.

Figure 3 is a section on line 3—3, Figure 2.

Figure 4 is a perspective view of the nut.

Figure 5 is a perspective view of the locking washer.

Referring to the drawing in detail, 1 denotes the threaded portion of the shank 2 of a bolt. The head of the bolt is indicated at 3. The shank or stem of the bolt is illustrated as extending through the object with which the bolt is to be used. Such object is indicated at 4. The shank or stem 2 projects a substantial distance from one side of the object 4. The head 3 abuts against the other side of the object 4.

The nut which threadedly engages with the threaded portion of the shank 2 of the bolt is indicated generally at 5 and is of polygonal contour. The outer face of the nut 5 is indicated at 6 and projecting outwardly from the latter is a lug 7 of the desired width and length. The inner face of the lug 7, such face indicated at 8, is disposed upon an arc similar to the arc 9 of the inner face of nut 5. The inner face 8 of lug 7 is threaded as at 10 to form a continuation of threads 11 on the inner face 8 of nut 5. The outer face 12 of lug 7 is beveled and the bevel extends downwardly from the outer face 6 of nut 5 to the outer end 13 of the lug 7. A transversely extending opening 14 is formed in the lug 7 adjacent the outer end thereof. The threads 10 and 11 engage with the threaded portion 1 of the shank or stem 2 of the bolt when positioning and removing on and from the bolt.

The nut lock further includes a locking washer 15 having a groove 16 extending from its inner edge of wall 17. The groove 16 is provided for the passage of the lug 7. The groove 16 includes a pair of side walls 18, 19 and an inner end wall 20 which is beveled as indicated at 21, Figure 2. The beveled face 12 of the lug 7 coacts with the beveled wall 20 of the groove 16 to set up a wedging action for the purpose of drawing the locking washer 15 tightly against the threaded portion 1 of the shank or stem 2 of the bolt. The inner face of the wall 17 of the locking washer 15 is provided with transversely extending teeth 22 which are disposed lengthwise with respect to the bolt and extend at right angles with respect to the threads 10, 11 and the threads of portion 1 of the bolt.

The coaction of the beveled face 12 and beveled wall 20 will, as before stated, bind the locking washer 15 against the threaded portion 1 of the stem or shank 2 of the bolt, and cause the teeth 22 to bite into the threads of the bolt to prevent the shifting of the washer relative to the bolt and to set up a binding action between the washer and the bolt, and arrest the revolving of the nut.

For the purpose of securing the washer 15 in set position a retaining member 23 is employed and which is in the form of a cotter pin and is extended through the opening 14 and bears against the outer face of washer 15. The opening provided by the washer 15 is of greater area than the diameter of the threaded portion 1 of the shank or stem of the bolt. See Figure 3. The binding engagement of the washer 15 with respect to the bolt is shown in Figure 3.

The position of the elements shown in Figures 2 and 3 will securely lock the nut 5 to prevent its turning relative to the bolt and will also act to prevent the bolt turning relative to the nut. The manner in which the elements of the lock coact will securely maintain the nut 5 against one face of the article or object 4.

The nut 5 can be conveniently released, and in this connection it will be stated that the cotter pin 23 will be removed from the lug 7 and the washer shifted off the latter. The nut 5 can then be rotated off the bolt or if it be desired, after the washer 15 has been removed, the nut 5 may be screwed toward object 4 if it be necessary.

What I claim is:

1. In a nut lock, a bolt engaging nut formed on one face with an outwardly directed lug having plural faces, one of the faces of said lug being arcuate and threaded and adapted to engage with the threads of the bolt, another of the faces of said lug being beveled, a locking washer for abutting said face of the nut and having a groove for the passage of said lug, one of the walls of said groove being beveled and coacting with said beveled face for drawing the washer against the threads of the bolt, said washer having teeth on its inner face to engage the threads of the bolt, and means carried by the lug for maintaining the washer in abutting engagement with respect to said face of the nut.

2. In a nut lock, a bolt engaging nut formed on one face with an outwardly directed lug having plural faces, one of the faces of said lug being arcuate and threaded and adapted to engage with the threads of the bolt, another of the faces of said lug being beveled, a locking washer for abutting said face of the nut and having a groove for the passage of said lug, one of the walls of said groove being beveled and coacting with said beveled face for drawing the washer against the threads of the bolt, said washer having teeth on its inner face to engage the threads of the bolt, and means carried by the lug for maintaining the washer in abutting engagement with respect to said face of the nut, the teeth on said washer extending at right angles with respect to the threads of the bolt.

3. A nut lock comprising a bolt engaging nut formed with a beveled lug having a threaded face for engagement with the threads of the bolt, a toothed locking washer for positioning against the nut and having means coacting with said lug for drawing the washer against the bolt whereby the teeth of the former will engage in the threads of the latter, and means carried by the lug for detachably securing said washer in bolt engaging position.

4. In a nut lock, a bolt engaging nut, a toothed locking washer, said nut and washer having coacting means for drawing the washer toward the bolt whereby the teeth of the former will engage the threads of the latter, said coacting means on the nut having an aperture, and removable means extending through said aperture for detachably securing the washer in bolt engaging position.

5. In a nut lock, in combination a nut having a beveled, threaded lug on its outer face for threaded engagement with a bolt, a locking washer having a groove for the passage of said lug and teeth on a part of its inner face opposing said groove, said washer having means coacting with said lug for shifting the washer in a direction to have its teeth engage in the threads of the bolt, and means carried by the lug for detachably securing the washer in bolt engaging position.

6. In a nut lock, in combination a nut having a beveled, threaded lug on its outer face for threaded engagement with a bolt, a locking washer having a groove for the passage of said lug and teeth on a part of its inner face opposing said groove, said washer having means coacting with said lug for shifting the washer in a direction to have its teeth engage in the threads of the bolt, and means carried by the lug for detachably securing the washer in bolt engaging position, the teeth of the washer extending at right angles to the threads of the lug.

7. In a nut lock a bolt engaging nut having a lug extended from one face thereof, said lug formed with a beveled face, a locking washer having a groove opening at the inner edge thereof for the passage of said lug, one wall of said groove being beveled and coacting with said beveled face for drawing the washer toward the threads of the bolt, and said washer having its inner edge provided with teeth to engage the threads of the bolt when the locking washer is drawn in a direction toward the bolt, and means carried by the lug for detachably securing said washer in lug and bolt engaging position.

8. In a nut lock a bolt engaging nut having a lug extended from one face thereof, said lug formed with a beveled face, a locking washer having a groove opening at the inner edge thereof for the passage of said lug, one wall of said groove being beveled and coacting with said beveled face for drawing the washer toward the threads of the bolt, said washer having its inner edge provided with teeth to engage the threads of the bolt when the locking washer is drawn in a direction toward the bolt, and means carried by the lug for detachably securing said washer in lug and bolt engaging position, said teeth disposed transversely of the inner edge of the washer and opposing said groove.

In testimony whereof, I affix my signature hereto.

MOSE LAVEQUE.